March 20, 1934. R. B. MILLER 1,951,623
VEHICLE WHEEL
Filed April 8, 1932
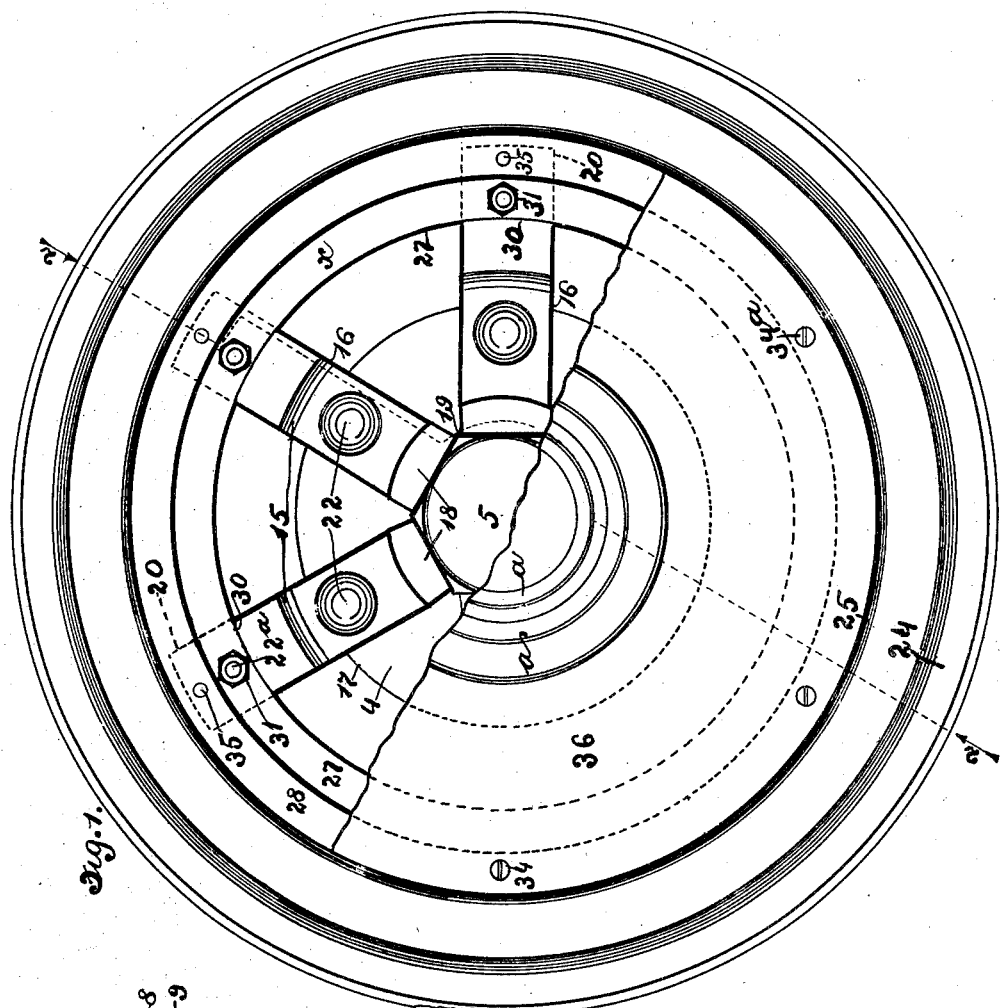
Inventor
Richard B. Miller Patented Mar. 20, 1934

1,951,623

UNITED STATES PATENT OFFICE 1,951,623

VEHICLE WHEEL

Richard B. Miller, Detroit, Mich.

Application April 8, 1932, Serial No. 603,915

9 Claims. (Cl. 301—6)

This invention relates to wheels for motor vehicles and is particularly, although not necessarily, concerned with wheels for light duty vehicles such as passenger cars, light duty trucks and the like.

An object of the invention is to provide an all-metal wheel assembly having an interior wheel-supporting body made up of parts which, while relatively light in weight, are so assembled and interlocked as to embody maximum strength, the wheel from the outboard side thereof simulating in effect an enlarged disk type hub member having a pleasing design.

Another object of the invention is to provide a wheel assembly of the all-metal type having a central hub and nave member made up as an integral casting or forging, which member may be of the type adapted for either driven or non-driven axle shafts and may be dissociated from the remaining parts of the assembly and substituted by another hub member without permanently damaging or injuring the remaining parts of the assembly.

Another object of the invention is to provide an all-metal wheel assembly which is particularly adapted for a composite brake drum member having a web or backing of relatively soft metal, such as pressed sheet metal, and a brake contacting member of hard wear-resisting material interlocked with said backing member.

Another object of the invention is to provide a wheel assembly of the all-metal type embodying a strong and rigid hub and nave member and parts associated and correlated therewith in a manner such that the load stresses are transmitted in a substantially straight radial line directly to the said hub and nave member, to thereby obtain maximum strength and at the same time produce a wheel which is relatively light in weight.

Another object of the invention is to provide an all-metal composite wheel assembly which is particularly adapted for tires of the low pressure type and has beauty and symmetry of design.

The present wheel assembly may be considered in the nature of an alternate type with respect to my copending application Serial No. 602,122, filed March 31, 1932.

With the foregoing and other objects and advantages in view, the invention consists in the preferred construction and arrangement of the several parts, which will be more fully hereinafter described and claimed.

In the drawing:

Figure 1 is a view in outboard side elevation of a wheel embodying the features of the present invention, the shell member which forms part of the assembly being broken away to show the interior construction; and Fig. 2 is a transverse sectional view of the improved wheel taken substantially on the line 2—2 of Fig. 1.

Referring to the drawing in detail, the main wheel-supporting assembly comprises an integral hub and nave member which is formed with a hub barrel 3 and a radial substantially disklike nave wall 4. This member may be formed of suitable cast or forged metal, and the wall 4 may be given any suitable dimensions, it being preferred to have the same extend in a substantially radial plane from an intermediate portion of the hub barrel. The conventional grease-retaining cap member or nut 5 is provided at the end of said barrel. The hub barrel may, obviously, be of the type adapted for either a front or rear wheel bearing. Associated with the wall 4 is a brake drum member which is preferably formed of pressed or drawn sheet metal and has a web wall 6 and a backing flange 7 terminating in a radial flange 8. The web 6 may be relatively short, its dimensions being governed to a large extent by the diameter of the nave wall 4, and has its radial inner edge snugly fitted against said wall as at 12 and 13. Rigidly secured within the backing flange 7 is a brake contacting member 9 having a web or attaching flange 10, said member being formed with a peripheral annular recess 11 in which the backing flange engages, the parts being secured in assembled position such as by rolling or pressing the flange 7 into the recess 11.

While it is preferred to employ a brake drum member of the composite type, it will be obvious that such member may be of integral one piece construction or of any other suitable type. A composite drum member of the type shown has the advantages of ease of manufacture, is relatively light in weight, and the brake contacting member may be replaced without destroying the entire drum.

To provide a means for rigidly holding the parts together and also for mounting a rim assembly, I provide a plurality of radially-extending fingers or bracket members 15, each of which is formed at an intermediate point with an offset 16 adapted to overlie the peripheral edge 17 of the nave wall 14. The radial inner extremity of each member 15 is preferably turned outwardly as at 18 and fitted against the outer periphery 19 of the hub barrel 3, a slight space being permitted at the radius where the wall 4 joins said barrel to permit the fingers to be clamped under tension thereagainst. The radial outer extremity of each of the members 15 is turned transversely inwardly to provide a snug fit on the periphery of the brake drum member, as at 20.

The bracket fingers 15, web 6 of the drum member, and nave wall 4 are securely fastened in assembled position by means of rivets or analogous member 22 which are passed through registering openings 21a formed in said parts.

The assembly just described forms the main central wheel-supporting structure, and in conjunction with this assembly I provide a demountable rim assembly comprising a tire rim, generally indicated at 23, said rim preferably being of the drop center type and having side walls 24 and a transverse base 25. As a convenient and efficient rim-mounting and supporting member, I provide an annular angle-shaped rim-mounting bracket whose transverse flange 26 is preferably permanently secured to the base of the rim by means such as the rivets 29, while the radial flange 27 of said bracket is adapted to seat in a recessed portion 30 formed in each of the bracket fingers 15 and is demountably secured in its seated position by means of lock nuts 31 adapted to be applied to bolts 22a which are also utilized as an additional securing means for the parts of the composite brake drum and peripheral portions 20 of the bracket fingers 15. These bolts 22a extend through and are preferably permanently secured to the flange 10, web wall 6 of the composite drum member, and the peripheral portions 20 of the bracket fingers 15 and have their threaded ends projected therebeyond to receive the rim-mounting bracket and lock nuts 31 for said bracket.

Covering the entire outboard side of the wheel, I provide a shell member which may be in the form of a sheet metal stamping, said shell member being provided with a substantially radially-extending peripheral portion 32, a frusto-conical body portion 33 terminating in a bead 34, and an end wall 35a which is preferably inset or dished to receive an ornamental cap member 36. The peripheral edge of the shell member is snugly fitted against a shell-attaching flange 28 formed on the annular rim-mounting bracket and detachably secured thereto by means of fillister screws 34a which are threaded into holes 35 formed in said flange. The decorative end cap 36 may be formed of suitable material and detachably secured to the shell 33 by means of a bracket member or staple 37 which is fastened to the said cap as at 38 and projected through an opening 39 in the end wall 35a of the shell proper and has its end suitably peened over or otherwise fastened as at 40 to give the cap 38 an attractive or ornamental appearance. The latter may be formed with annular depressions a or analogous configurations. It will thus be seen that the shell proper may be formed of sheet metal which may be easily stamped out or worked, while the cap 38 may be formed of any suitable material and given any particular design or configuration. The frusto-conical contour of the shell, while being preferred, is not essential and may be varied at will.

From the foregoing, it will be seen that I have provided a composite wheel assembly which is particularly adapted for the modern light duty vehicle employing the popular low pressure tires of large cross sectional diameter and which is so constructed that the load stresses are applied in a substantially direct radial line from the rim through the bracket fingers 15 to the nave wall 4 and hub barrel 3. The bracket members 15 may be formed of any suitable material, such as malleable iron or the like, and may be of a strength consistent with the load stresses to which the wheel is subjected. The shell member constitutes, in effect, an essential part of the assembly, since it completes the symmetrical contour of the main wheel-supporting structure and gives the wheel the appearance of a large disk type hub. While I have shown a certain number of finger brackets 15, it will be understood that these may be reduced in number or increased in accordance with the duties to which the wheel may be called upon to perform, the object being to provide ample strength yet at the same time to keep the weight of the wheel as low as possible. To demount the rim assembly, it is only necessary to remove the shell member, whereupon access is had to the lock nuts 31.

It will be understood that certain minor modifications and changes in structure may be adopted without departing from the scope of the invention as defined by the appended claims.

I claim:

1. A metal wheel assembly for motor vehicles comprising a hub member formed with a hub barrel and an integral disk-like wall projecting radially therefrom, a brake drum member fitted against and secured to the inboard side of said wall, a plurality of fingers fitted against and secured to the outboard side of said wall and extending radially and being transversely offset to fit flush against said brake drum member, a tire rim, an angle-shaped rim-mounting bracket member secured to said rim and demountably secured to said fingers, and a shell covering the outboard side of the wheel.

2. A metal wheel assembly for motor vehicles comprising a hub member of hard metal such as forged or cast steel formed with a hub barrel and a relatively short disk-like wall projecting radially therefrom, a separate brake drum member having its web portion fitted against and secured to the inboard side of said wall, a plurality of radially projecting fingers fitted against and secured to the outboard side of said wall, each of said fingers being transversely offset to provide a supporting shoulder which rests on the periphery of said wall and transmits the load directly thereto and to the hub barrel, a tire rim, an annular angle-shaped rim-mounting bracket member having a transverse flange which is permanently secured to said rim and a radial flange which is demountably secured to said fingers, and a shell covering the entire outboard side of the wheel.

3. A metal wheel assembly for motor vehicles comprising a hub member of hard metal such as forged or cast steel formed with a hub barrel and an integral disk-like wall projecting radially a relatively short distance therefrom, a separate brake drum member having its web portion fitted against and secured to the inboard side of said wall, a plurality of radially projecting fingers fitted against and secured to the outboard side of said wall, each of said fingers having its inner extremity clamped against the hub barrel and at an intermediate point being transversely offset over the periphery of said disk-like wall to transmit the load directly thereto and to the hub barrel at the rim, an annular angle-shaped rim-mounting bracket member having a transverse flange which is permanently secured to said rim and a radial flange which is seated in recessed portions of said fingers and demountably secured thereto, and a shell covering the entire outboard side of the wheel.

4. A metal wheel assembly for motor vehicles comprising a hub member of hard metal such as forged or cast steel formed with a hub barrel and an integral disk-like wall projecting radially a relatively short distance therefrom, a separate brake drum member having its web portion fitted against the inboard side of said wall and secured thereto, a plurality of radially projecting fingers secured to the outboard side of said wall, each of said fingers being formed with an outwardly turned toe portion which is clamped under tension against the hub barrel and an intermediate transversely offset portion defining a shoulder which engages the periphery of the disk-like wall and transmits load stresses directly thereto and to the hub barrel, the radially outer extremity of each finger being formed with a further shoulder, a tire rim, an annular rim-mounting bracket having a transverse flange which is secured to said rim and a radial flange which seats on said second-named shoulder and is demountably secured to said fingers, and a shell covering the entire outboard side of the wheel.

5. A metal wheel assembly for motor vehicles comprising a hub member of hard metal such as forged or cast steel formed with a hub barrel and an integral disk-like wall projecting radially a relatively short distance therefrom, a separate brake drum member of relatively soft metal such as pressed sheet metal having its web portion fitted against the inboard side of said wall and secured thereto, a brake contacting member of hard wear-resisting metal interlocked with said brake drum member, a plurality of radially projecting fingers secured to the outboard side of said disk-like wall, each of said fingers being formed with an intermediate transverse offset which engages the periphery of said disk-like wall and transmits load stresses directly thereto and a radially outer extremity which is turned over the periphery of the drum member in locking engagement therewith, a tire rim, an angle shaped rim mounting bracket having a transverse flange which is secured to said rim and a radial flange which is engaged in recessed portions formed in the outer extremities of said fingers, means for securing said bracket, fingers and drum member in assembled position, and a shell covering the entire outboard side of the wheel and detachably secured to said bracket.

6. A metal wheel assembly for motor vehicles comprising a hub member formed with a hub barrel and an integral disk-like wall projecting radially a relatively short distance therefrom, a separate brake drum member fitted against and secured to the inboard side of said wall, a plurality of radially projecting fingers secured to the outboard side of said wall, each of said fingers being transversely offset over the periphery of said wall and locked to said drum member, a tire rim, means for supporting said rim on said fingers, and a shell covering the entire outboard side of the wheel.

7. A metal wheel assembly for motor vehicles comprising a hub member formed with a relatively short radial disk-like wall, a separate drum member, a plurality of radially projecting fingers secured to the outboard side of said wall, each of said fingers being transversely offset over the periphery of said wall and locked to said drum member, a tire rim, means engaged in a recessed portion of said fingers for supporting said rim thereon, the load stresses being transmitted in a straight line from the rim through the offset portion of said fingers to said disk-like wall, and a shell covering the entire outboard side of the wheel.

8. A metal wheel assembly for motor vehicles particularly adapted for low pressure tires of relatively large cross-sectional diameter comprising a hub member provided with a hub barrel and a disk-like nave wall, a brake drum member fitted against and secured to the inboard side of said wall, a plurality of substantially radially-extending members each of which is fitted against and secured to the outboard side of said wall and is provided with a portion which overlies the periphery of said wall and is fitted flush against said brake drum member, a tire rim, rim-mounting means secured to said rim and demountably secured to said radially-extending members, and a shell member covering the outboard side of the wheel and simulating in effect an enlarged disk hub.

9. A metal wheel assembly particularly adapted for low pressure tires of relatively large cross-sectional diameter comprising a hub member provided with a hub barrel and a disk-like nave wall, a brake drum member fitted against and secured to the inboard side of said wall, a plurality of substantially radially-extending members each of which is fitted at its inner extremity against the periphery of the hub barrel and the outboard side of said nave wall and secured to the latter and is provided at an intermediate point with a portion which overlies the periphery of the nave wall, the outer extremity of each of said radially-extending members being secured to the brake drum and also formed with a seat, a tire rim, an angle-shaped rim-mounting member secured to said rim and having a radial portion adapted to engage in the seats of the radially-extending members, means for demountably securing said rim-mounting member in assembled position, and a shell member covering the outboard side of the wheel and simulating in effect an enlarged disk hub.

RICHARD B. MILLER.